United States Patent
Neer et al.

[15] 3,701,908
[45] Oct. 31, 1972

[54] PEAK DETECTOR AND AMPLIFIER CIRCUIT

[72] Inventors: Harold M. Neer; Vern A. Street, both of Bartlesville, Okla.

[73] Assignee: Phillips Petroleum Company

[22] Filed: Feb. 1, 1971

[21] Appl. No.: 111,203

[52] U.S. Cl..................307/235, 330/17, 330/30 R, 330/30 D, 330/35, 307/230, 307/304

[51] Int. Cl..............................................H03k 5/20

[58] Field of Search ........330/16, 17, 30 R, 30 D, 35; 307/235, 304, 230

[56] References Cited

UNITED STATES PATENTS

| | | |
|---|---|---|
| 3,237,117 | 2/1966 | Collings et al. ..........330/30 R |
| 3,496,452 | 2/1970 | Vollink.......................:...330/16 |
| 3,551,839 | 12/1970 | Barker......................330/30 X |
| 3,566,291 | 2/1971 | Tice..........................330/30 R |

Primary Examiner—John S. Heyman
Attorney—Young & Quigg

[57] ABSTRACT

An output circuit is provided for use with a chromatographic analyzer. The analyzer output is amplified and passed through an attenuation network to an integrator. The output signal from the integrator is applied selectively through an amplifier to the input of the first amplifier to provide an automatic zero circuit. Additional differentiating, peak reading and storage circuits are selectively connected to the output of the integrator.

9 Claims, 5 Drawing Figures

INVENTORS
H. M. NEER
V. A. STREET

INVENTORS
H. M. NEER
V. A. STREET

BY Young & Quigg

ATTORNEYS

PEAK DETECTOR AND AMPLIFIER CIRCUIT

In the analysis of fluid mixtures by chromatography, an electrical signal usually is established which is representative of the composition of the effluent stream from a chromatographic column. This signal can be obtained from a bridge network having temperature sensitive resistance elements therein or by a flame ionization detector, for example. The signal is amplified and applied through an attenuation network to suitable recording and/or control equipment. In many applications it is desirable to employ an integrator to measure the areas under individual peaks. The attenuation network permits the amplitudes of the signals which are representative of individual peaks to be varied so that all of the peaks can be recorded using substantially the full scale of the recorder. An automatic programmer is usually employed to adjust the attenuation network during the analysis as the individual peaks are detected.

It is desirable to calibrate the measuring circuit periodically to eliminate errors which may result from drift in the circuit components. In accordance with one embodiment of this invention, apparatus is provided for applying an amplifier feedback signal from the output of the measuring circuit to the input of the measuring circuit in such a manner as to eliminate drift. This feedback network utilizes an amplifier having extremely high gain and a storage device to maintain the feedback signal. In accordance with another embodiment of this invention, an improved circuit is provided for differentiating the output signal from the integrator to provide an amplified signal representative of individual peaks in the chromatographic column effluent. An improved analog signal storage circuit is provided in accordance with still another embodiment of this invention.

Figure 1:
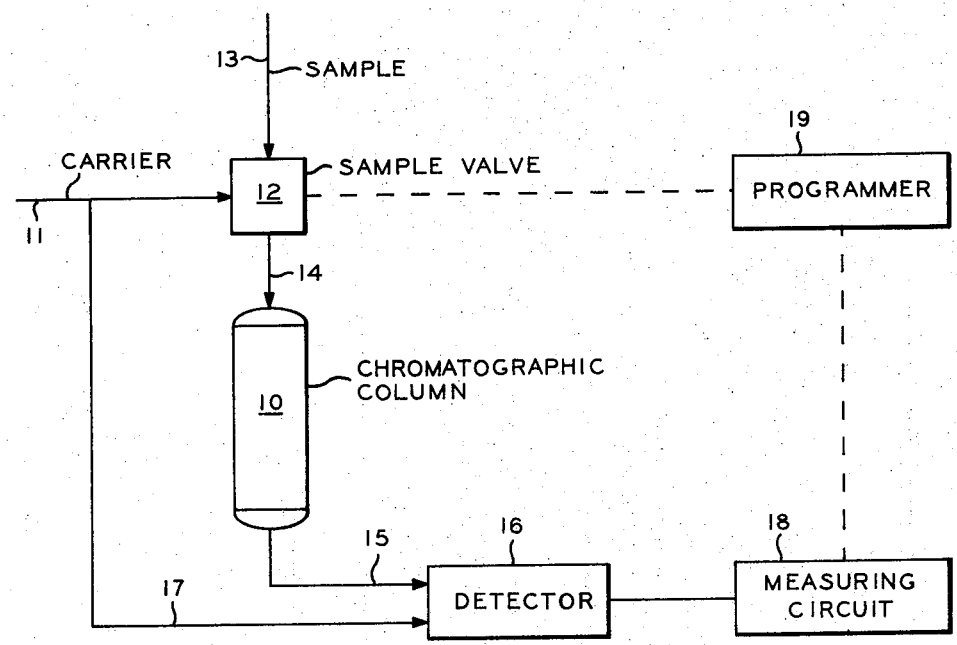
FIG. 1 is a schematic representation of a chromatographic analyzer having the improved measuring circuit of this invention incorporated therein.

Referring now to the drawing in detail and to FIG. 1 in particular, there is shown a chromatographic column 10. A carrier fluid is introduced through a conduit 11 which communicates with a sample valve 12. A sample of a fluid to be analyzed is delivered to valve 12 through a conduit 13. A conduit 14 extends between valve 12 and the inlet of column 10. A conduit 15 extends between the outlet of column 10 and the first inlet of a differential detector 16. Carrier fluid is introduced into the second inlet of detector 16 through a conduit 17 which communicates with inlet conduit 11. Detector 16 establishes an electrical signal which is representative of the composition of the effluent from column 10. This signal is applied to a measuring circuit 18. A programmer 19 is provided to control valve 12 and switches within the measuring circuit in the manner to be described.

The apparatus illustrated in FIG. 1 constitutes a conventional chromatographic analyzer. Carrier fluid initially passes through valve 12 and column 10 to the first inlet of detector 16. Additional carrier fluid passes directly to the second inlet of detector 16. Detector 16 provides an electrical signal which is representative of any difference between the compositions of the two fluids passed thereto. At the beginning of an analysis period, sample valve 12 is actuated to introduce a predetermined volume of sample into column 10. Carrier fluid then continues to flow to the column to elute the constituents of the sample in sequence. Circuit 18 is employed to measure changes in the column effluent as established by the output signal from detector 16.

Figure 2:
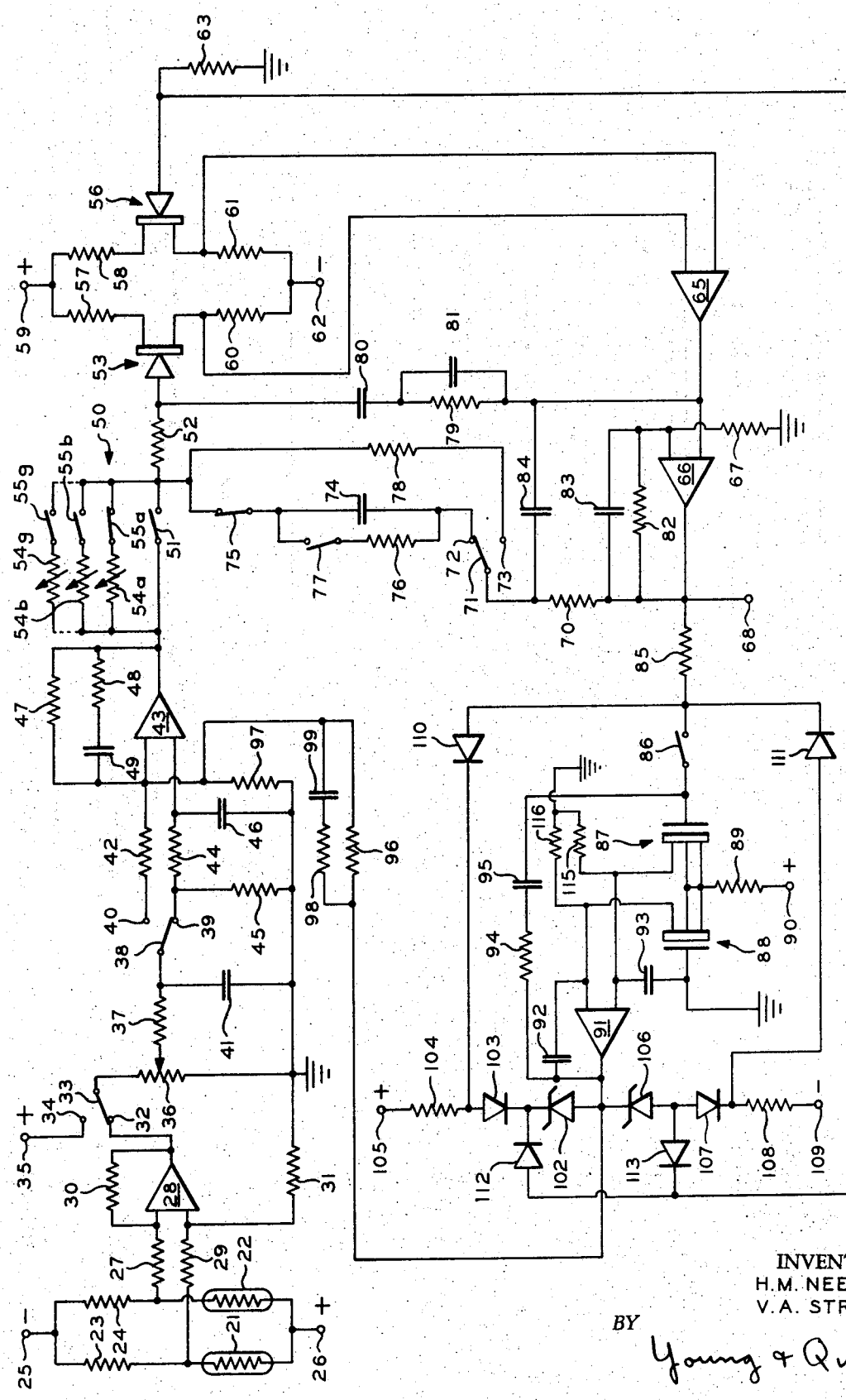
FIG. 2 is a schematic circuit drawing of the measuring circuit which includes a feedback network to zero the circuit.

Measuring circuit 18 is shown in FIG. 2. In the specific embodiment illustrated, the detector is provided with two thermistors 21 and 22 which are positioned in thermal contact with the respective flowing streams. However, other types of detectors, such as flame ionization detectors, can be utilized. Thermistors 31 and 32 are connected in a bridge circuit with resistors 23 and 24. A potential difference is applied across the bridge circuit from terminals 25 and 26. The junction between thermistor 22 and resistor 24 is connected by a resistor 27 to the first input of a differential amplifier 28. The junction between thermistor 21 and resistor 23 is connected by a resistor 29 to the second input of amplifier 28. A feedback resistor 30 is connected between the output and the first input of amplifier 28. A resistor 31 is connected between the second input and ground. The output of amplifier 28 is connected to a terminal 32 which is normally engaged by a switch 33. Switch 33 can also be moved into engagement with a terminal 34 which is connected to a potential terminal 35. In order to calibrate the circuit, a reference potential of adjustable magnitude to be applied to terminal 35 and switch 33 can be moved into engagement with terminal 34 to apply this reference potential to the remainder of the measuring circuit in place of the amplified output signal from the bridge.

Switch 33 is connected to the first end terminal of a potentiometer 36, the second end terminal of which is connected to ground. The contactor of potentiometer 36 is connected by a resistor 37 to a switch 38 which is adapted to engage terminals 39 and 40 selectively. A capacitor 41 is connected between switch 38 and ground. Terminal 40 is connected by a resistor 42 to the first input of an amplifier 43, and terminal 39 is connected by a resistor 44 to the second input terminal of amplifier 43. A resistor 45 is connected between terminal 39 and ground, and a capacitor 46 is connected between the second input terminal of amplifier 43 and ground. A feedback resistor 47 is connected between the output of amplifier 43 and the first input thereof. A resistor 48 and a capacitor 49 are connected in series with one another and in parallel with resistor 47.

Switch 38 permits the polarity of the input signal to amplifier 43 to be reversed, as may be required to accomodate a detector signal of reversed polarity which sometimes is obtained in measuring certain components. The resistors and capacitors connected between potentiometer 36 and amplifier 43 serve to filter the input signal to remove stray alternating components which may be introduced into the system.

The output signal from amplifier 43 is applied to the input of a signal attenuation network 50. A normally open switch 51 is connected between amplifier 43 and the first terminal of a resistor 52, the second terminal of which is connected to the gate of a J-FET (field-effect transistor) 53. A variable resistor 54a and a switch 55a are connected in series relationship with one another and in parallel with switch 51. In similar fashion, additional resistors 54b ... 54g and associated switches 55b ... 55g are connected in parallel with switch 51. The individual switches 55 are closed sequentially by programmer 19 to provide selective attenuation of signals representative of the individual peaks as they appear in the column effluent. Actually, these switches are normally relay contacts actuated by the programmer.

Transistor 53 and a corresponding transistor 56 constitute the input stage of a high gain amplifier which normally serves as an integrator. The drain electrodes of transistors 53 and 56 are connected by respective resistors 57 and 58 to a positive potential terminal 59. The source electrodes of these two transistors are connected by respective resistors 60 and 61 to a negative potential terminal 62. The gate of transistor 56 is connected by a resistor 63 to ground. The source electrodes of transistors 53 and 56 are connected to the respective inputs of a differential amplifier 65. The output of amplifier 65 is connected to the first input of an amplifier 66. The second input of amplifier 66 is connected by a resistor 67 to ground. The output of amplifier 66 is connected to a terminal 68 which in turn can be connected to a recorder and/or other measuring or control equipment.

In a first mode of operation, transistors 53 and 56, amplifier 65, and amplifier 66 constitute an integrating amplifier. To this end, the output of amplifier 66 is connected by a resistor 70 to a manually operated switch 71 which selectively engages terminals 72 and 73. A capacitor 74 is connected between terminal 72 and input resistor 52 by means of a normally closed switch 75. When switch 71 is in engagement with terminal 72, capacitor 74 is connected in the feedback path of the amplifier to form an integrator. In order to reset the integrator, a resistor 76 and a switch 77 are connected in parallel with capacitor 74. A resistor 78 is connected between terminal 73 and resistor 52. When switch 71 is in engagement with terminal 73, the described amplifier provides amplification without integration. A resistor 79 and a capacitor 80 are connected in series relationship between the output of amplifier 65 and the gate of transistor 53. A capacitor 81 is connected in parallel with resistor 79. A resistor 82 and a capacitor 83 are connected in parallel relationship with one another between the output and the second input of amplifier 66. A capacitor 84 is connected between resistor 70 and the first input of amplifier 66.

The remainder of the circuit illustrated in FIG. 2 is provided to zero the detecting circuit automatically at preselected intervals determined by programmer 19. This is performed when carrier fluid alone is flowing to both inlets of detector 16. At such time, the output signal from the bridge should be zero. The output of amplifier 66 is connected by a resistor 85 and a normally open switch 86 to the gate electrode of a MOS-FET (metal-oxide-semiconductor field effect transistor) 87. The gate of a second corresponding transistor 88 is connected to ground. The substrate and source electrodes of these two transistors are connected by a resistor 89 to a positive potential terminal 90. The drain electrodes of the two transistors are connected to the respective inputs of an amplifier 91 and to ground by respective resistors 115 and 116. A capacitor 92 is connected between the output of amplifier 91 and the first input thereof. A capacitor 93 is connected between the second input of amplifier 91 and ground. A resistor 94 and a capacitor 95 are connected in series between the output of amplifier 91 and the gate of transistor 87. The output of amplifier 91 is connected by a resistor 96 to the first input terminal of amplifier 43. A resistor 97 is connected between this input terminal and ground. A resistor 98 and a capacitor 99 are connected in series relationship with one another and in parallel with resistor 96.

The output of amplifier 91 is connected by a Zener diode 102, a diode 103 and a resistor 104 to a positive potential terminal 105. The amplifier output is also connected by a Zener diode 106, a diode 107 and a resistor 108 to a negative potential terminal 109. A diode 110 is connected between resistor 85 and the junction between resistor 104 and diode 103. A diode 111 is connected between diode 107 and resistor 85. A diode 112 is connected between the gate of transistor 56 and Zener diode 102. A diode 113 is connected between Zener diode 106 and the gate of transistor 56. These diodes prevent overloading, or aid in overload recovery of the amplifier circuits.

When it is desired to zero the circuit, switch 86 is closed and switch 71 is moved into engagement with terminal 73. Switch 51 is closed to remove the attenuation resistors and provide maximum gain. Any output signal which appears at terminal 68 results in a potential being applied to the input of amplifier 43 of a magnitude and polarity such as to drive the output signal at terminal 68 to zero. The potential so applied to the input of amplifier 43 is stored on capacitor 95 after switch 86 is opened so that this potential is maintained at the input of amplifier 43 until the automatic zero circuit is once again employed. The use of the MOS-FET input stage in the feedback amplifier greatly facilitates the storage of the feedback potential on capacitor 95.

Figure 3:
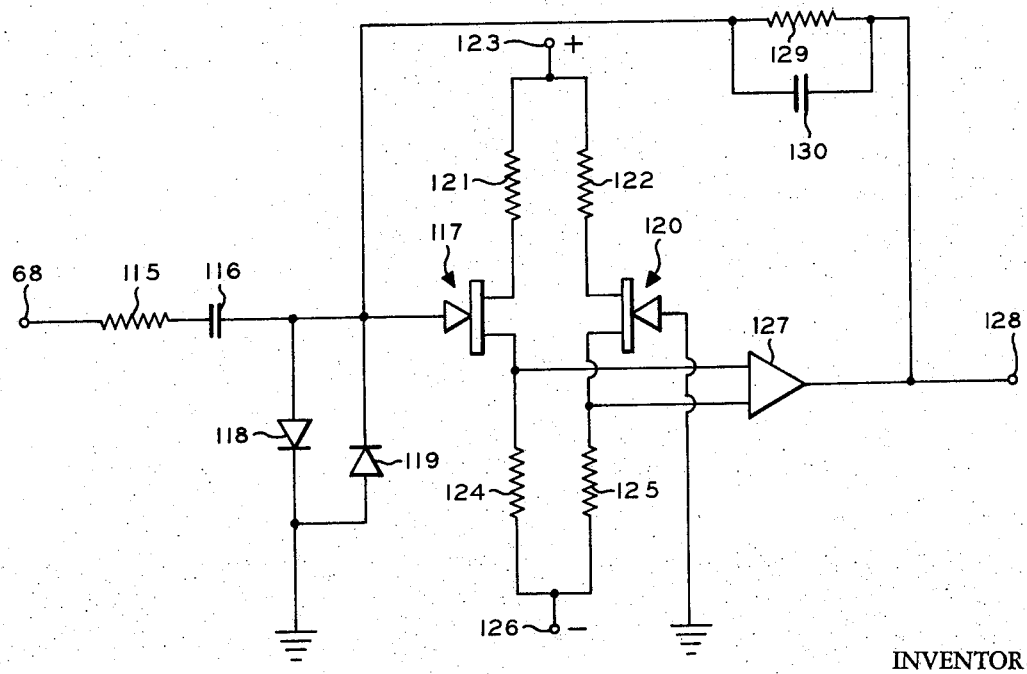
FIG. 3 illustrates a differentiating circuit adapted to be connected to the output of the measuring circuit of FIG. 2.

In some operations it is desirable to provide output signals which are directly representative of the individual peaks of the sample constituents appearing in the column effluent rather than of the integrals of the peaks. This can be accomplished by connecting the circuit illustrated in FIG. 3 to output terminal 68 of FIG. 2. As shown in FIG. 3, a resistor 115 and a capacitor 116 are connected in series relationship between input terminal 68 and the gate of a J-FET transistor 117. This transistor is protected by diodes 118 and 119 which are connected between the gate and ground. The gate of a second J-FET transistor 120 is connected to ground. The drain electrodes of the two transistors are connected by respective resistors 121 and 122 to a positive potential terminal 132. The source electrodes of the two transistors are connected by respective resistors 124 and 125 to a negative potential terminal 126. The source electrodes of the two transistors are also connected to the respective inputs of an amplifier 127, the output of which is connected to an output terminal 128. A feedback resistor 129, having a capacitor 130 connected in parallel therewith, is connected between the output of amplifier 127 and the gate of transistor 117. The circuit of FIG. 3 thus constitutes a differentiating circuit. When connected to the output of the integrating amplifier of FIG. 2, the net result is to provide a signal at terminal 128 which is representative of the individual peaks established by the output signal from the bridge of FIG. 2. This circuit is useful when it is desirable to record the individual peaks as well as, or in place of, the integrals of the peaks.

In some operations, it is desirable to record an output signal which is representative of the peak heights of the individual peaks. This can be accomplished by means of the circuit illustrated in FIG. 4 which can be connected to output terminal 68 of FIG. 2. This circuit utilizes an amplifier corresponding to that shown in FIG. 3 and corresponding elements are designated by like primed reference numerals. A resistor 135 is connected between terminal 68 and the first input of an amplifier 136. A resistor 137 and diode 138 are connected in series relationship between the output of amplifier 136 and the gate of transistor 117'. The output of amplifier 127' is connected to an output terminal 140 and to the second input terminal of amplifier 136. A resistor 141 and a capacitor 142 are connected in series relationship between the output of amplifier 127' and the gate of transistor 117'. A switch 143 is connected in parallel with capacitor 142. When switch 143 is opened, capacitor 142 is charged to a potential which is representative of the maximum amplitude of the input signal received at terminal 68. This potential is applied to output terminal 140 and is stored on capacitor 142 until switch 143 is closed to discharge the capacitor. Programmer 19 can close switch 143 after each individual peak is measured.

Figure 5:
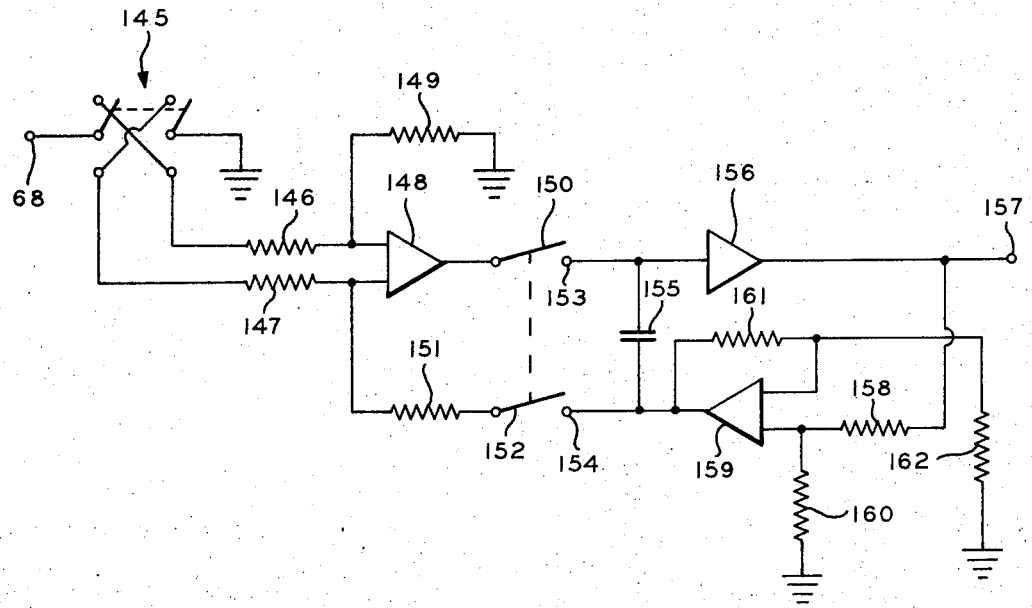
FIG. 5 is a schematic circuit drawing of an analog storage circuit adapted to be connected to the output of the measuring circuit of FIG. 2.

The circuit illustrated in FIG. 5 is employed to store in analog form the output signal from the measuring circuit of FIG. 2. Terminal 68 is connected to a reversing switch 145. The output terminals of this switch are connected by respective resistors 146 and 147 to the two inputs of an amplifier 148. Switch 145 permits the polarity of the input signal to be reversed. The first input of amplifier 148 is connected by a resistor 149 to ground. The output of amplifier 148 is connected to a switch 150, and the second input of amplifier 148 is connected by a resistor 151 to a second switch 152 which is coupled to switch 150. Switches 150 and 152 engage respective terminals 153 and 154 when closed. A capacitor 155 is connected between these two terminals. Terminal 153 is connected to the input of an amplifier 156, the output of which is connected to an output terminal 157. The output of amplifier 156 is connected by a resistor 158 to the first input of an amplifier 159. This first input is also connected by a resistor 160 to ground. The output of amplifier 159 is connected to terminal 154. A resistor 161 is connected between the output and the second input of amplifier 159. This second input is connected by a resistor 162 to ground. When switches 150 and 152 are closed a potential is stored on capacitor 155 which is representative of the signal received at terminal 68. This potential remains on capacitor 155 after the switches are opened to provide a fixed potential at terminal 157.

This potential can be employed for control purposes. Switches 150 and 152 can be operated by programmer 19. Amplifier 156 advantageously includes a MOS-FET input stage of the type associated with amplifier 91 of FIG. 2.

Figure 4:
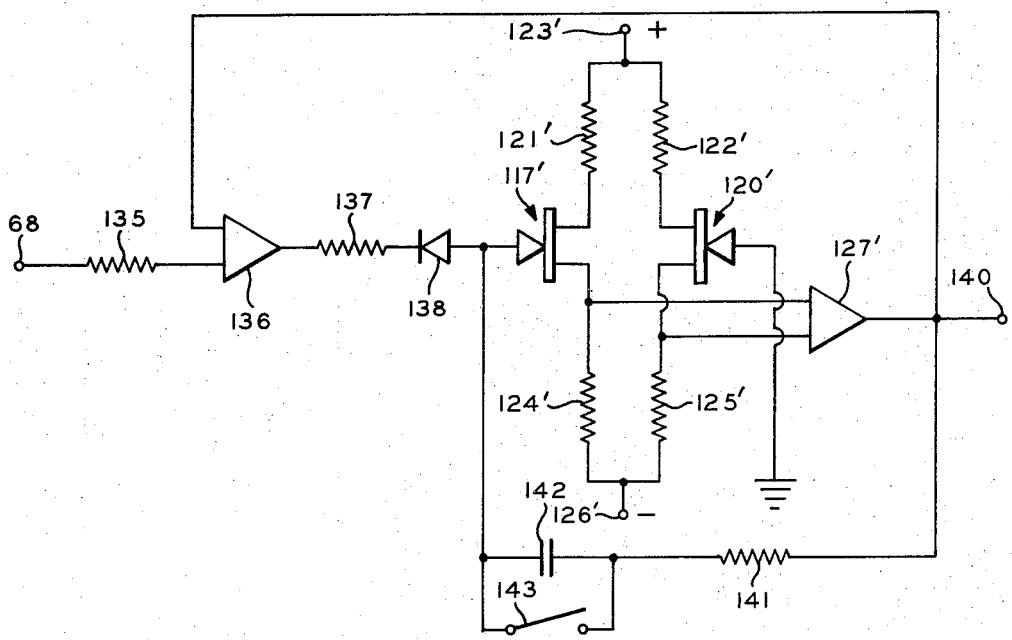
FIG. 4 is a schematic circuit drawing of a peak detecting circuit adapted to be connected to the output of the measuring circuit of FIG. 2.

As previously mentioned, programmer 19 can be adjusted to open and close the switches in FIGS. 2, 4 and 5 automatically at desired times. These times initially are determined by recording a chromatogram with a typical sample to be analyzed. Programmer 19 can employ a rotating disk with selected holes punched therein to pass light from a source to a series of photocells. These photocells can energize logic circuits to perform the switching functions. As an alternative, other types of programmers known in the art can be employed.

The various amplifiers which are illustrated schematically can be conventional high gain operational amplifiers. The J-FET amplifiers can be type 2N3955, and the MOS-FET amplifiers can be type 3N165.

While this invention has been described in conjunction with presently preferred embodiments, it obviously is not limited thereto.

What is claimed is:

1. A detector circuit adapted for use in a chromatographic analyzer comprising:
   a first amplifier adapted to receive at its input a signal from a chromatographic analyzer;
   a second amplifier including a capacitor and first switching means to connect the capacitor selectively between the output and the input of said second amplifier to provide an integrator when the capacitor is so connected;
   an attenuation network including second switching means to connect said network selectively between the output of said first amplifier and the input of said second amplifier;
   a third amplifier;
   third switching means to connect said third amplifier selectively between the output of said second amplifier and the input of said first amplifier to apply a feedback signal from the output of said second amplifier through said third amplifier to the input of said first amplifier; and
   signal storage means connected to the input of said first amplifier to store a signal representative of the output signal from said third amplifier.

2. The circuit of claim 1 wherein said third amplifier includes a differential amplifier having first and second inputs, first and second metal-oxide-semiconductor field effect transistors, means to connect the gate of said first transistor to the output of said second amplifier, means to connect the gate of said second transistor and the substrate and source electrodes of said first and second transistors to a point of reference potential, and means connecting the drain electrodes of said first and second transistors to the respective inputs of said differential amplifier, the output of said differential amplifier representing the output of said third amplifier.

3. The circuit of claim 2 wherein said storage means comprises a capacitor connected between the input of said first amplifier and the first input of said differential amplifier.

4. The circuit of claim 1, further comprising a differentiating circuit connected to the output of said second amplifier.

5. The circuit of claim 4 wherein said differentiating circuit comprises an operational amplifier having a feedback resistor and having a capacitor in the input thereof.

6. The circuit of claim 1, further comprising a signal storage circuit connected to the output of said second amplifier.

7. The circuit of claim 6 wherein said signal storage circuit comprises a second capacitor, a fourth differential amplifier, means connecting the output of said second amplifier to one input of said fourth amplifier and means connecting the other input of the fourth amplifier to a point of reference potential, switching means to connect said second capacitor selectively between the output and one of the inputs of said fourth amplifier, a fifth amplifier having the input thereof connected to one terminal of said second capacitor, the output of said fifth amplifier representing the output of said storage circuit, a sixth differential amplifier having the output thereof connected to the second terminal of said second capacitor, means connecting the output of said fifth amplifier to one input of said sixth amplifier, means connecting the second input of said sixth amplifier to a point of reference potential.

8. The circuit of claim 1, further comprising a peak indicating circuit connected to the output of said second amplifier.

9. The circuit of claim 8 wherein said peak indicating circuit comprises a fourth differential amplifier, means connecting the output of said second amplifier to one input of said fourth amplifier, a fifth amplifier, the output of said fifth amplifier representing the output of said peak indicating circuit, circuit means including a diode connecting the output of said fourth amplifier to the input of said fifth amplifier, means connecting the output of said fifth amplifier to the second input of said fourth amplifier, and a second capacitor connected between the output and the input of said fifth amplifier.

* * * * *